March 17, 1931.  A. WARMISHAM  1,797,202
PHOTOGRAPHIC AND PROJECTION OBJECTIVE
Filed Aug. 30, 1926
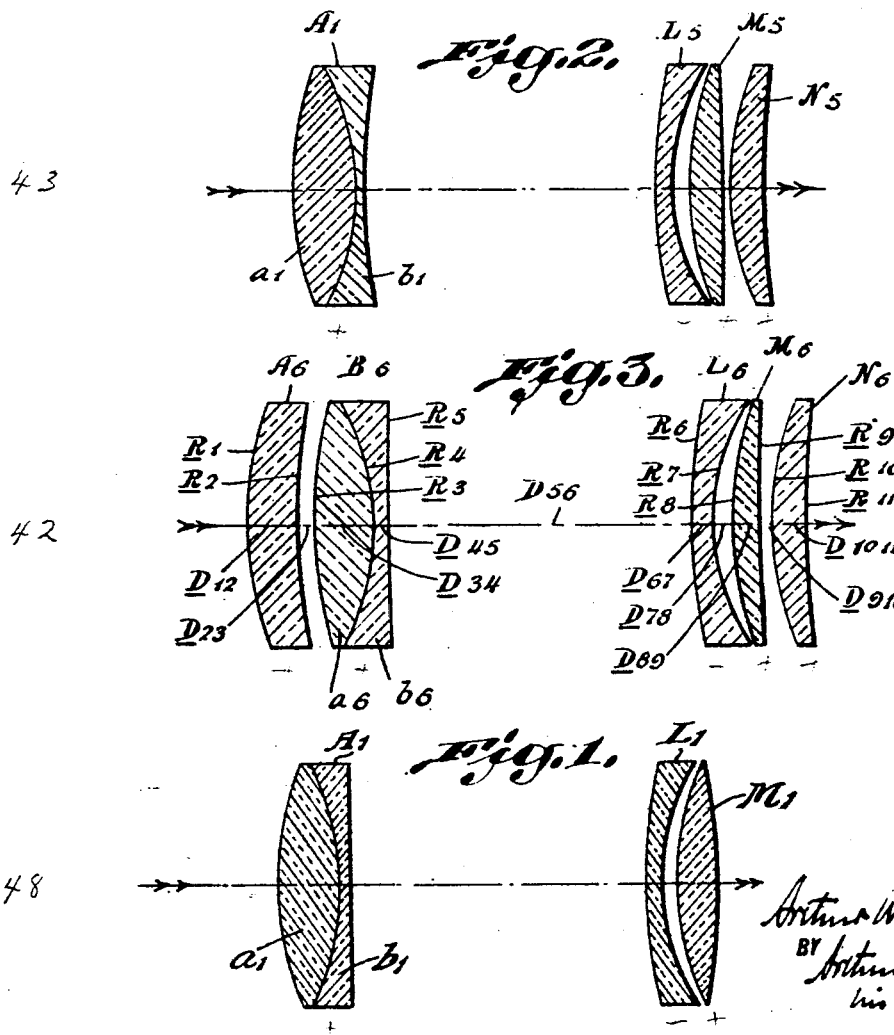

Patented Mar. 17, 1931

1,797,202

UNITED STATES PATENT OFFICE

ARTHUR WARMISHAM, OF LEICESTER, ENGLAND, ASSIGNOR TO KAPELLA LIMITED, OF LEICESTER, ENGLAND, A CORPORATION OF ENGLAND

PHOTOGRAPHIC AND PROJECTION OBJECTIVE

Application filed August 30, 1926, Serial No. 132,591, and in Great Britain September 26, 1925.

This invention relates to photographic and projection objectives and its aim is to provide such objectives corrected for the various aberrations throughout a useful field and having a larger working aperture than hitherto obtained.

According to the invention, I achieve this aim by a novel modification of the Petzval type of objective, my novel modification consisting in dividing the rear convergent member into two convergent members whereby the residual zonal spherical aberration is so reduced as to enable me to produce objectives of relative aperture F/1.5 while maintaining a sufficiently good state of correction of the zonal spherical aberration to give definition comparable with that given by the conventional Petzval objectives having about two-thirds of this effective diameter.

The invention will be explained in connection with the accompanying drawings, in which:—

Fig. 1 is a diagrammatic view of the conventional Petzval objective given for the purpose of comparison and to facilitate the definition of the terms hereinafter used; and Figs. 2 and 3 are similar views of various different objectives embodying the invention.

Throughout this specification I shall refer to the front of the objective as the end thereof adjacent to the longer conjugate for which the objective is corrected (that is the end which receives the incident light when the objective is used photographically) and to the back of the objective as the end thereof adjacent to the shorter conjugate (that is the end toward the image when the objective is used photographically). The conventional Petzval objective shown in Fig. 1 may, therefore, be defined as consisting of two separated components in which the front component is a single convergent member $A'$ consisting of two elements $a'$, $b'$, cemented together, while the back component consists of a negative member $L'$ and a positive member $M'$, each of which is a single element. From this description, it will be understood that I am using the term "element" to indicate a single piece of glass or "simple lens", and the term "member" to indicate complete lens which may consist of a single element like the members L, M, or may consist of two elements cemented together like the member A. In other words, I shall use the term "member" to indicate a complete lens out of contact with other lenses, whether such lens be simple or compound.

The conventional type of Petzval objective has only two convergent members, one in its front component, and one in its back component. By extensive investigations, I have determined that it is this fact which limits the effective working aperture in such objectives, by making impossible satisfactory elimination of the zonal spherical aberration when the relative aperture exceeds F/2. According to my invention, the residual zonal spherical aberration is reduced to make possible an increase in the effective working aperture, by substituting a number of separate convergent members for the single convergent member in the back component of an objective of the Petzval type.

Fig. 2 illustrates a simple embodiment of the invention. The objective shown in this figure has its front component formed of a single convergent compound member $A_1$ like the front component of the conventional type. The back component consists of three separate members, a divergent member $L_5$ similar to that of the conventional type and two convergent members $M_5$, $N_5$. The members $M_5$, $N_5$ are most desirably made of crown glass of high refractive index. They are unsymmetrical and present their more deeply curved surfaces toward the front component. Each of the three members of the back component may consist of a single element as shown.

In Fig. 3 is shown another embodiment. The objective shown in Fig. 3 has a front component consisting of two convergent members $A_6$, $B_6$ and a back component consisting of one divergent member $L_6$ and two convergent members $M_6$, $N_6$. The two convergent members $M_6$, $N_6$ of the back component are unsymmetrical and present their more deeply curved surfaces toward the front component.

To further illustrate the invention, I give a numerical example of objectives of large aperture, constructed in accordance with the invention. The example may be taken to apply to the objective illustrated in Fig. 3. The notation of the example is that the successive radii of curvature, counting from the front, are called $R_1$, $R_2$, etc., and the sign $+$ denotes that the curve is convex toward the front, and $-$ that it is concave toward the front. The axial distances between the surfaces $R_1$ and $R_2$ are denoted by $D_{12}$ and so on. The material is defined in terms of the mean refractive index $nD$ and the mean dispersive power $V$, as conventionally employed, and further by the type-number in Messrs. Chance Brothers' optical glass catalogue.

E. F. L. 1.084    Relative Aperture F/1.5

| | | | $nD$ | $V$ | Chance Brothers Catalogue Number |
|---|---|---|---|---|---|
| $R_1 +1.0103$ | | | | | |
| $R_2 +1.938$ | $D_{12}$ | .082 | 1.5736 | 57.7 | 9002 |
| $R_3 + .7143$ | $D_{23}$ | .002 | Air. | | |
| $R_4 -1.1905$ | $D_{34}$ | .210 | 1.5290 | 51.6 | 7863 |
| $R_5 +2.0000$ | $D_{45}$ | .032 | 1.6512 | 33.5 | 5093 |
| $R_6 +1.1693$ | $D_{56}$ | .326 | Air. | | |
| $R_7 + .4711$ | $D_{67}$ | .047 | 1.6512 | 33.5 | 5093 |
| $R_8 + .6250$ | $D_{78}$ | .047 | Air. | | |
| $R_9 +2.1190$ | $D_{89}$ | .080 | 1.6129 | 59.3 | 4873 |
| $R_{10}+ .5910$ | $D_{9-10}$ | .000 | Air. | | |
| $R_{11}+1.3330$ | $D_{10-11}$ | .080 | 1.6129 | 59.3 | 4873 |

What is claimed is:

1. An objective of the Petzval type, in which the back component includes two unsymmetrical convergent members presenting their more deeply curved surfaces toward the front component.

2. An objective of the Petzval type, in which the back component consists of a divergent member and two unsymmetrical convergent members presenting their more deeply curved surfaces toward the front component.

In testimony whereof I have hereunto set my hand.

ARTHUR WARMISHAM.